United States Patent [19]

Bucksch et al.

[11] 4,384,082

[45] May 17, 1983

[54] POLYMERIZATION PROCESS

[75] Inventors: Günter Bucksch; Herbert Tyras, both of Duisburg, Fed. Rep. of Germany

[73] Assignee: Rutgerswerke Aktiengesellschaft, Frankfurt am Main, Fed. Rep. of Germany

[21] Appl. No.: 317,586

[22] Filed: Nov. 3, 1981

[30] Foreign Application Priority Data

Nov. 27, 1980 [DE] Fed. Rep. of Germany ....... 3044592

[51] Int. Cl.³ .......................... C08F 2/00; C08F 110/00
[52] U.S. Cl. .................................... 525/369; 526/212; 526/290
[58] Field of Search ................. 526/212, 290; 525/369

[56] References Cited

U.S. PATENT DOCUMENTS

| | | | |
|---|---|---|---|
| 2,373,725 | 4/1945 | Ward | 526/290 |
| 3,880,820 | 4/1975 | Sato | 526/290 |
| 4,098,983 | 7/1978 | Osborn et al. | 526/290 |
| 4,105,843 | 8/1978 | Iwase et al. | 526/212 |
| 4,113,931 | 9/1978 | Spengler et al. | 526/290 |

*Primary Examiner*—Harry Wong, Jr.
*Attorney, Agent, or Firm*—Hammond & Littell, Weissenberger and Muserlian

[57] ABSTRACT

In a process for the polymerization of unsaturated aromatic hydrocarbons with $BF_3$-etherate or $BF_3$-phenolate as the polymerization catalyst, the improvement comprising using $BF_3$-alcoholates as a co-catalyst.

4 Claims, No Drawings

POLYMERIZATION PROCESS

STATE OF THE ART

The catalytic polymerization of unsaturated aromatic hydrocarbons such as those obtained as distillates from high-temperature coal tars boiling in the range of 140° to 210° C. or obtained by cracking of naphtha or gas oil or by the pyrolysis of cracking residues is known. The said unsaturated aromatic hydrocarbons are usually concentrated in the fractionation range of 160° to 220° C. and are called the resin-oil fraction.

The commercial polymerization of these unsaturated aromatic compounds is usually effected with acids or Friedel-Crafts catalysts to obtain a high yield of polymers with a high degree of polymerization which polymers are preferably clear.

Clear resins of this type with a high softening point have been produced in good yields using boron trifluoride as the catalyst. Since gaseous boron trifluoride is difficult to handle and causes corrosion and environmental problems, the polymerization catalyst is $BF_3$-etherate or $BF_3$-phenolate which must be carefully and accurately used depending on the course of the polymerization to obtain a maximum resin yield with high softening point and clarity.

Particularly in intermittent processes, it is necessary to activate the catalyst with traces of water toward the end of the polymerization to obtain a sufficient degree of polymerization but for some purposes, a completely anhydrous polymer is required and this technique can not be used. An improvement of the resin quality can also be achieved if the catalyst in the polymer is neutralized with solid alkaline earth metal hydroxide but in such a procedure, even small amounts of water can no longer be tolerated.

OBJECTS OF THE INVENTION

It is an object of the invention to provide a polymerization of unsaturated aromatic hydrocarbons with a $BF_3$-etherate or phenolate catalyst to obtain a completely anhydrous polymer and the polymer resulting therefrom.

It is another object of the invention to provide a novel catalyst mixture comprising $BF_3$-methanolate and either $BF_3$-etherate or $BF_3$-phenolate.

These and other objects and advantages of the invention will become obvious from the following detailed description.

THE INVENTION

The process of the invention comprises polymerizing unsaturated aromatic hydrocarbons in the presence of $BF_3$-methanolate and $BF_3$-etherate or $BF_3$-phenolate as co-catalysts. Preferably, the co-catalysts are used in a weight ratio of 0.1 to 1 parts of $BF_3$-alcoholates per one part of $BF_3$ etherate or $BF_3$-phenolate. The amount of the catalyst used in the polymerization will vary but usually ranges from 0.1 to 2 percent by weight of the polymerization mixture.

U.S. Pat. No. 3,780,128 describes the use of $BF_3$-alcoholates and especially $BF_3$-methanolate for the polymerization of olefins such as $C_6$-$C_{16}$ alpha-olefins. Japanese published application No. 73-23051 [Chem. Abs., Vol. 78, 19544a] describes the polymerization of propylene with $BF_3$-methanolate. Attempts to polymerize unsaturated hydrocarbons with $BF_3$-methanolate as the catalyst have shown that the polymerization is very difficult to control and unsatisfactory yields of darker products resulted.

Surprisingly, it has been found that the problems of reaction control and unsatisfactory polymerization are avoided using a catalyst of $BF_3$-alcoholates and $BF_3$-etherate or $BF_3$-phenolate and the resulting polymers are clear and photostable and have a higher softening point than the polymers using $BF_3$-etherate or $BF_3$-phenolate followed by water addition of the known polymerization process. Another advantage resides in the fact that less catalyst is required as compared to the known process and the resin yield is even higher.

The catalyst in the polymer may be neutralized with solid alkaline earth metal hydroxide such as calcium hydroxide and the neutralized product may be simply and quantitatively removed by filtration resulting in a resin of improved quality as compared to that obtained by the known method of washing the catalyst out with water or an alkaline solution. The elimination of acid waste water is avoided and since the resulting resin is completely anhydrous, distillation expenses are reduced.

The polymerization method may be employed with carbon raw materials as well as petroleum derived raw materials with the same course of polymerization with both types. However, since the greatest difficulties of the prior art were encountered with petroleum derived unsaturated aromatic hydrocarbons, the process is particularly valuable for polymerization of these hydrocarbons.

In the following examples there are described several preferred embodiments to illustrate the invention. However, it should be understood that the invention is not intended to be limited to the specific embodiments.

In the examples, $BF_3$-methanolate is the preferred $BF_3$-alcoholate. But also $BF_3$-ethanolate, -propanolate, -isopropanolate or dihydric alcoholates, for instance $BF_3$-glycolate, can be used.

EXAMPLE 1

10,000 kg of a resin oil fraction from pyrolysis oil with a boiling range of 160° to 220° C. and a 61% content of unsaturated aromatic hydrocarbon were admixed with vigorous stirring with 7 kg of $BF_3$-etherate with cooling to keep the reaction temperature below 100° C. and the mixture was stirred for 30 minutes. Then, 4 kg of $BF_3$-2$CH_3OH$ or boron trifluoride-methanolate were added to the mixture with stirring and after stirring for 45 minutes, another 4 kg of $BF_3$-2$CH_3OH$ were added with stirring. After the mixture was stirred for another 30 minutes, the polymerization was complete and the reaction mixture was completely anhydrous. The mixture was neutralized by solid calcium hydroxide addition and was then filtered. A resin isolated from the filtrate had a softening point of 122° C. (Kraemer-Sarnow) and a clearness value greater than B 1 (Barrett). The yield of resin was 56% by weight of the original material or 92% based on the content of unsaturated aromatic hydrocarbons.

EXAMPLE 2

For comparison purposes, 10,000 kg of the said resin oil used in Example 1 were admixed with vigorous stirring with 7 kg of $BF_3$-etherate and after stirring the mixture for 30 minutes, 4 kg more of $BF_3$-etherate were added to the mixture. The mixture was stirred for 45 minutes and then another 4 kg of $BF_3$-etherate were added to the mixture. Stirring was continued for 60 minutes after which 3 kg of $BF_3$-etherate were added to the mixture followed by the introduction of a blast of steam to the mixture. After a reaction time of 75 minutes, 54% by weight of the initial material was polymerized and the catalyst was removed by water washing of the polymer and the organic solution was dried and distilled to obtain a resin with a softening point of 115° C. (Kraemer-Sarnow) and a clearness value of 1 (Barrett).

Various modifications of the products and process of the invention may be made without departing from the spirit or scope thereof and it is to be understood that the invention is intended to be limited only as defined in the appended claims.

What we claim is:

1. In a process for the polymerization of unsaturated aromatic hydrocarbons obtained as distillates from high-temperature coal tars boiling in the range of 140° to 210° C. or obtained by cracking of naphtha or gas oil or by the pyrolysis of cracking residues with $BF_3$-etherate or $BF_3$-phenolate as the polymerization catalyst, the improvement comprising using $BF_3$ alcoholates as a co-catalyst in a weight ratio of 0.1 to 1 parts of $BF_3$ alcoholates per one part of $BF_3$-etherate or $BF_3$-phenolate.

2. The process of claim 1 wherein the catalyst is neutralized with solid alkaline earth metal hydroxide after completion of the polymerization and removed by filtration.

3. The process of claim 2 wherein the alkaline earth metal hydroxide is calcium hydroxide.

4. The process of claim 1 wherein the $BF_3$-alcoholate is $BF_3$-methanolate.

* * * * *